Patented Dec. 9, 1952

2,621,214

UNITED STATES PATENT OFFICE 2,621,214

BENZALDEHYDE ACETALS AND PROCESS OF PRODUCING THE SAME

Adolph J. Deinet, East Paterson, N. J., assignor to Heyden Chemical Corporation, New York, N. Y., a corporation of Delaware No Drawing. Application February 23, 1950, Serial No. 145,918

5 Claims. (Cl. 260—611)

My invention relates especially to a process for producing benzaldehyde acetals and the products produced thereby, which are especially suitable for use in the perfume and flavoring industries.

An object of my invention is to provide a process for obtaining benzaldehyde acetals, whereby the benzaldehyde acetals may be readily obtained. They, usually, are high boiling and consequently substantially inseparable by distillation from the impurities and tarry contaminants that would be formed in other processes of producing acetals.

According to the classical methods, the acetals are produced by the reaction of an aldehyde with an alcohol in the presence of hydrochloric acid according to the reaction $$2ROH + R'CHO \rightarrow R'CH(OR)_2 + H_2O$$

Another process that has been used for the preparation of acetals comprises passing acetylene into an alcohol in the presence of a catalyst, generally a mercury salt. Other processes of making acetals have been proposed, but not from benzaldehyde dimethyl acetal. Where distillation has been involved, this has made them unsuitable and impractical for the production of high boiling acetals, due to the difficulty of separating the latter from the high boiling alcohols, the dark colored high-boiling impurities and tarry contaminants, which would render any such high-boiling acetals, if made in that way, unsuitable for the perfume and flavoring industries.

Thus, the present invention makes it possible to produce by a practicable method a number of acetals of benzaldehyde which were not previously known and by a process in which no high boiling, dark-colored polymeric by-products are formed, so that after the removal of the low-boiling unreacted and partially reacted starting materials by distillation, etc., the desired products are obtained in a substantially pure, colorless form suitable for use in the said industries.

Furthermore, it has not previously been possible to prepare acetals, using unsaturated alcohols because of the tendency of the alcohols to polymerize before the acetal reaction can take place.

With this acetal interchange process it has become possible to prepare in pure and colorless form a number of benzaldehyde acetals which could not previously be prepared. These are, for instance, the allyl acetal and acetals of alcohols having 8 to 18 carbon atoms in the alkyl groups.

In general, my process may be carried out by heating benzaldehyde dimethyl acetal, which can be readily obtained in pure form by distilling the reaction product of benzaldehyde and methanol, with a higher alcohol to yield methanol and the desired acetal of benzaldehyde, for instance in accordance with the following general reaction:

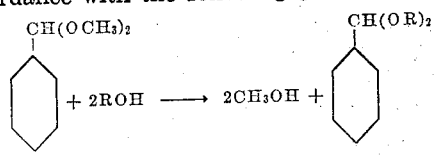

in which R is an alkyl radical containing from 3 to 18 carbon atoms. By the "higher alcohols" I mean those containing from 3 to 18 carbon atoms. However, my invention is especially useful in connection with the alcohols containing 8 to 18 carbon atoms.

It is found that this reaction gives good yields of the desired acetal irrespective of whether the alcohol employed is saturated (for instance dodecanol), or unsaturated (for instance allyl alcohol), or a straight chain (for instance n-octanol), or a branched chain (for instance 2-ethylhexanol), or primary (for instance octadecanol), or secondary (for instance 2,6,8-trimethyl-nonanol-4).

The initial yields obtained by this interchange process are generally 30 to 60% by weight, but overall yields of more than 90% can be obtained, when the recovered unreacted starting materials are recycled, due to the absence of tarry polymers which are obtained in previous processes, so that the reagents could not be effectively recycled to increase the yields.

For example, in carrying out my invention benzaldehyde dimethyl acetal may be prepared by heating 1 mole of benzaldehyde with 2 moles of methanol in the presence of a catalytic amount of hydrochloric acid, for instance in an amount equal to 0.05% by weight of the said aldehyde and methanol.

After distillation thereof under a vacuum of 15 mm., this product is used in the acetal interchange reactions described in the following examples, the amounts given being by weight:

1. Benzaldehyde di(n-butyl) acetal

Three moles (222 parts by weight) of n-butanol and 1.5 moles (228 parts by weight) of benzaldehyde dimethyl acetal are placed in a flask equipped with a suitable modified Hahn condenser containing ethanol in the inner condensing tube (see Organic Reactions, II, 197). The mixture is heated to about 100° C. util the evolution of methanol has substantially subsided. The temperature is then slowly raised to 140–145° C. and is held in about this range until the evolution of methanol has become negligible. A total of eight hours heating is generally required for the reaction.

When the products of the reaction are distilled through a 12" Vigreaux column, 190 parts of the desired acetal is obtained as a fraction at 145–147° C. at a pressure of 10 mm. of mercury. This amounts to a 54% yield of benzaldehyde di(n-butyl) acetal. The product so obtained has a refractive index of 1.47147.

The other fractions obtained during the distillation consist principally of unreacted materials, all of which could be used in future runs, if desired, in accordance with this process.

2. Benzaldehyde di(n-octyl) acetal n-Octyl alcohol (195 parts by weight, 1.5 moles) and benzaldehyde dimethyl acetal (114 parts by weight, 0.75 mole) are heated together at about 160° C. for 24 hours. The products of the reaction are then distilled through a 12" Vigreaux column at 0.2 mm. pressure. A nitrogen capillary is used to prevent foaming and to facilitate distillation. The product benzaldehyde di(n-octyl) acetal, obtained in a 50% yield, boils at 155° C. at 0.2 mm. It is a water-white oil with a refractive index of 1.47246.

3. Benzaldehyde di(2-ethylhexyl) acetal

One hundred and ninety parts by weight (1.25 moles) of benzaldehyde dimethyl acetal and 325 parts by weight (2.5 moles) of 2-ethylhexanol are heated together at about 170° C. for 20 hours.

One hundred and ninety parts by weight of unreacted starting material is recovered upon distillation at 70–90° C./15 mm. The remainder of the reaction mix is distilled through a 12" Vigreaux column at 0.5 mm. Two hundred and forty-one parts by weight of material boiling at 147–154° C. is obtained. This amounts to a 56% initial yield of the acetal. The refractive index of the product is 1.47046. The other fractions obtained during the distillation consist of unreacted or partially reacted starting materials which are suitable for use in further runs.

4. Benzaldehyde di(n-dodecyl) acetal

A mixture of 114 parts by weight (0.75 mole) of benzaldehyde dimethyl acetal, 280 parts (1.5 moles) of lauryl (dodecyl) alcohol, 0.5 part of anhydrous calcium chloride and a trace of dry hydrogen chloride is heated to about 210° C. over a period of one hour. When distilled at a pressure of 0.5 mm., the reaction mixture yields 155 parts (45% initial yield) of the desired product ($n_D$—1.46533). The other fractions obtained could be recycled.

5. Benzaldehyde di(n-octadecyl) acetal n-Octadecanol (730 parts by weight, 2.7 moles), benzaldehyde dimethyl acetal (270 parts by weight, 1.70 moles) and ammonium chloride (1 part by weight) are heated together at about 170° C. for 6 hours, at the end of which time the evolution of methanol has subsided. Another part by weight of ammonium chloride is added, and the heating is continued for an additional 4 hours. The volatile materials present are separated from the product by distillation at a pressure of 1 mm. until a temperature of about 250° C. is reached. One part of ammonium chloride is added to the distillate, which is then heated to about 160° C. for 1 hour. The reaction mixture is heated under a pressure of 1 mm. to 250° C., using a nitrogen capillary to aid the distillation. A total of 866 parts of a white wax melting at 35° C. is obtained by this method. This amounts to a yield of 100% (based on octadecanol).

6. Benzaldehyde diallyl acetal

One mole (152 parts by weight) of benzaldehyde dimethyl acetal and 2 moles (116 parts by weight) of allyl alcohol are heated to about 80° C. and then over a period of 10 hours to about 105° C. Following this, the reaction mixture is distilled through a 12" Vigreaux column at 16 mm. pressure to yield 67 parts (33% conversion) of the desired acetal ($n_D$—1.5003). The remainder of the distillate consists of incompletely reacted materials which could be reused by recycling in future runs.

7. Benzaldehyde di[1 - (2 - methylpropyl)-3,5-dimethylhexyl] acetal

A mixture of 120 parts by weight (0.8 mole) of benzaldehyde dimethyl acetal, 200 parts (0.8 mole) of 2,6,8-trimethyl-nonanol-4, and 1 part of ammonium chloride is heated at about 180° C. for 12 hours.

The temperature is then raised to about 210° C. over a 4 hour period.

Upon distilling at 0.5 mm. through a 12" Vigreaux column, 102 parts by weight of the desired acetal is collected. This amounts to a 44% initial yield. The other fractions obtained in the distillation consist of unreacted and partially reacted starting materials which can be used by recycling in further runs.

While I have described my invention above in detail, it is to be understood that many changes may be made therein without departing from the spirit thereof.

I claim:

1. As a chemical compound, benzaldehyde di(n-octyl) acetal.

2. As a chemical compound, benzaldehyde di(n-dodecyl) acetal.

3. As a chemical compound, benzaldehyde di(n-octadecyl) acetal.

4. As a chemical compound, benzaldehyde di[(1-methylpropyl)-3,5-dimethylhexyl] acetal.

5. The chemical compound having the formula:

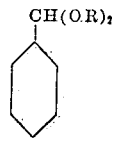

in which R is an alkyl radical containing 8 to 18 carbon atoms.

ADOLPH J. DEINET.

REFERENCES CITED

The following references are of record in the file of this patent:

UNITED STATES PATENTS

| Number | Name | Date |
|---|---|---|
| 2,241,200 | Hopff | May 6, 1941 |
| 2,321,557 | Sussman | June 8, 1943 |
| 2,321,593 | Gresham | June 15, 1943 |
| 2,451,949 | Heinemann | Oct. 19, 1948 |
| 2,477,218 | Thompson | July 26, 1949 |